United States Patent

[11] 3,583,138

| [72] | Inventor | Charles A. Mattson<br>Oak Park, Ill. |
|---|---|---|
| [21] | Appl. No. | 764,565 |
| [22] | Filed | Oct. 2, 1968<br>Division of Ser. No. 562,666, Jul. 6, 1966,<br>Pat. No. 3,468,108. |
| [45] | Patented | June 8, 1971 |
| [73] | Assignee | Sunbeam Corporation<br>Chicago, Ill. |

[54] LAWN MOWER GRASS BAG
11 Claims, 13 Drawing Figs.

| [52] | U.S. Cl. | 56/202 |
|---|---|---|
| [51] | Int. Cl. | A01d 35/22 |
| [50] | Field of Search | 56/199, 202 |

[56] References Cited
UNITED STATES PATENTS

| 3,099,123 | 7/1963 | Price | 56/202 |
|---|---|---|---|

FOREIGN PATENTS

| 716,774 | 8/1965 | Canada | 56/202 |
|---|---|---|---|

*Primary Examiner*—A. F. Guida
*Attorney*—George R. Clark

ABSTRACT: A grass bag assembly for a rotary lawn mower having a lateral discharge opening with a supporting wall positioned near the bottom thereof and a bracket located near the top of the opening wherein the bag assembly is pivotally engageable with the bracket and rests on the supporting wall.

INVENTOR
CHARLES A. MATTSON by Robert W. Dudley
ATTORNEY

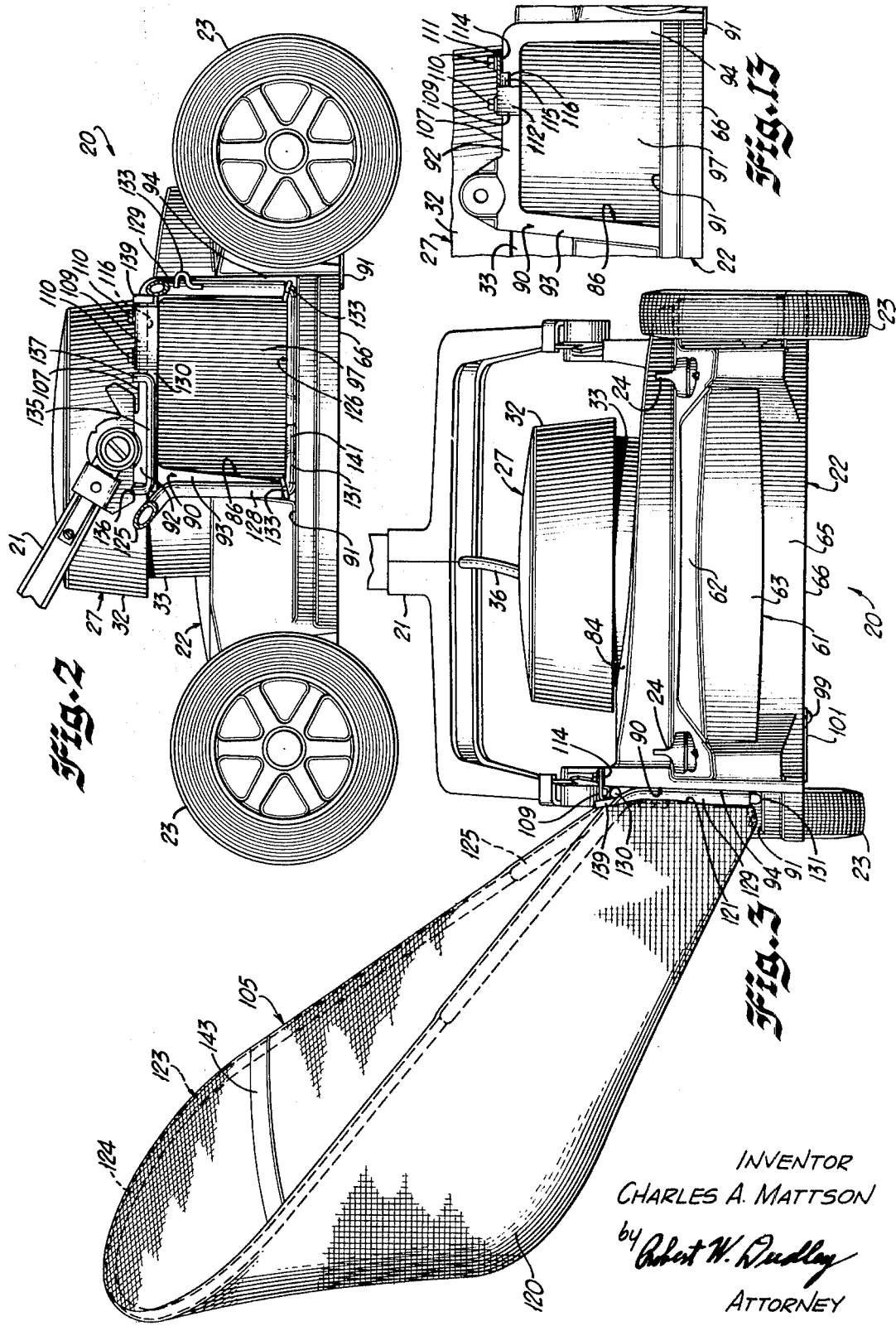

INVENTOR
CHARLES A. MATTSON
by Robert W. Dudley
ATTORNEY

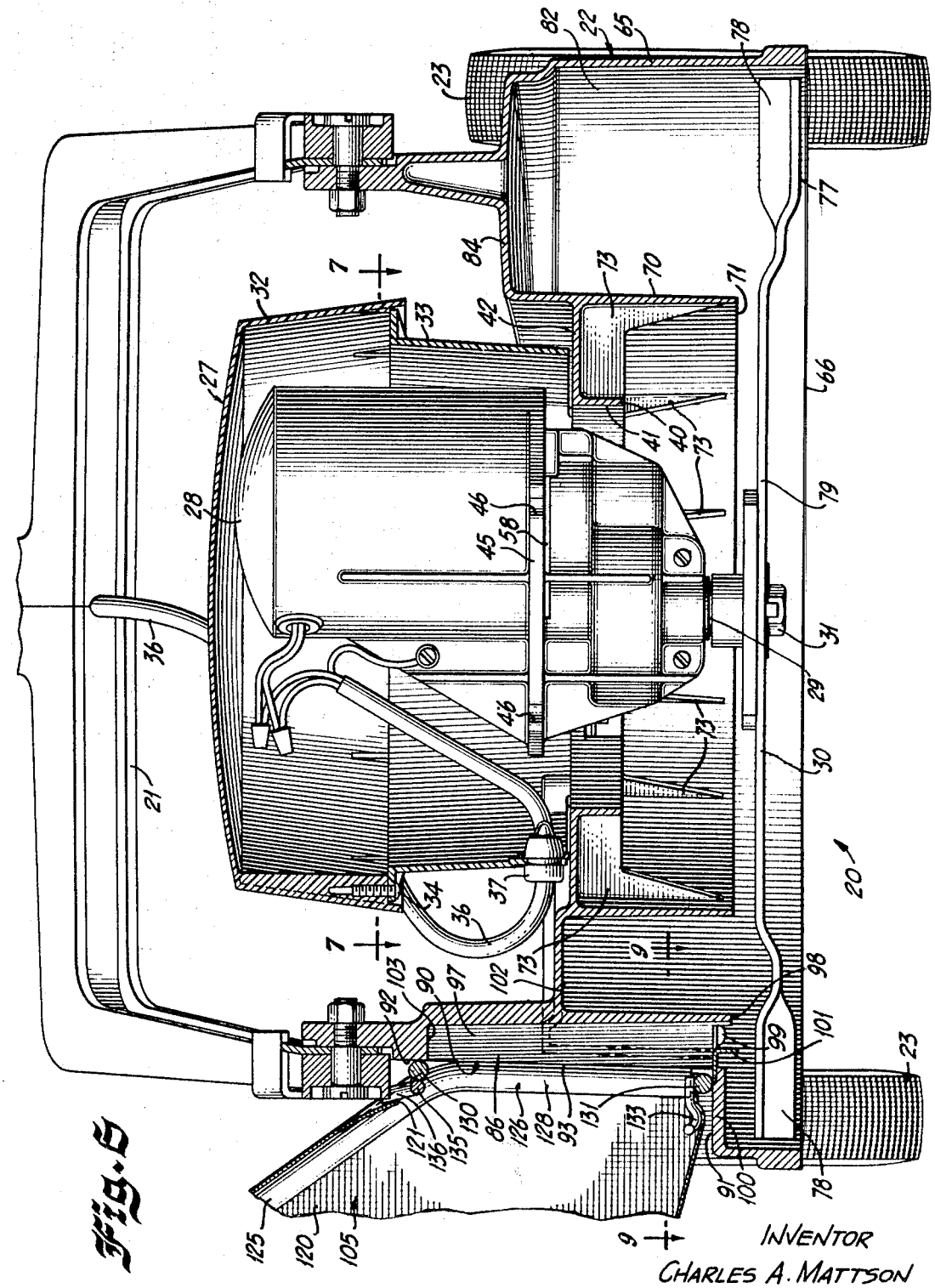

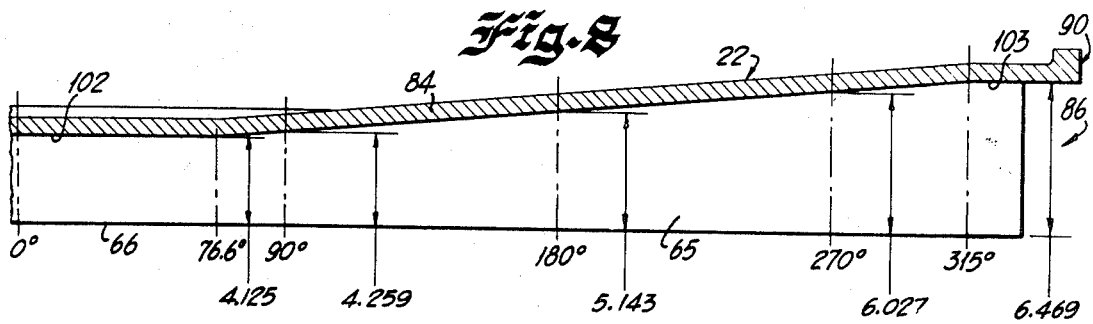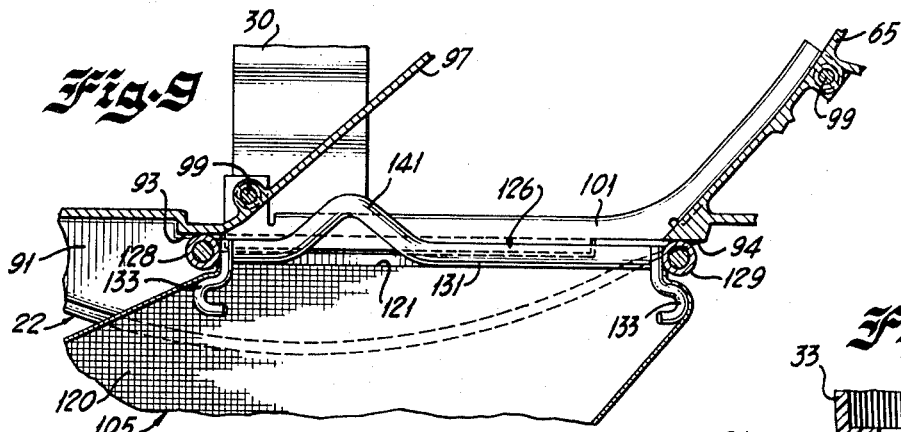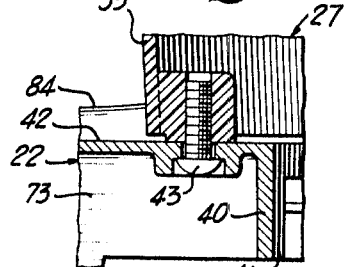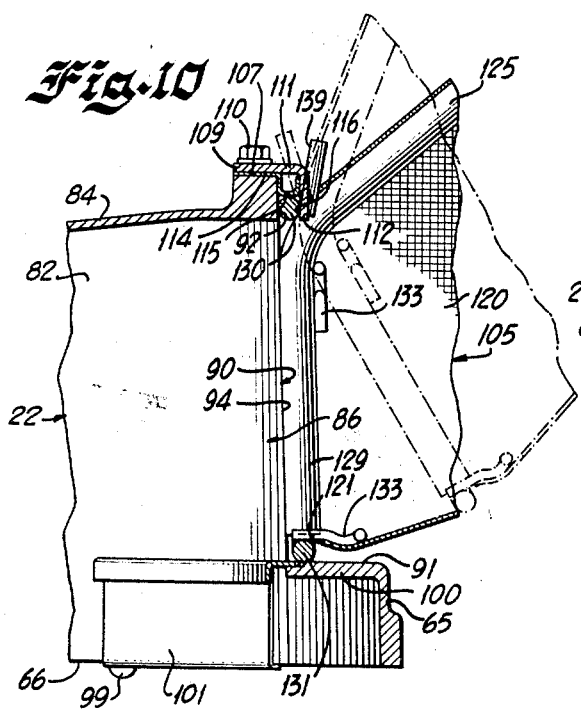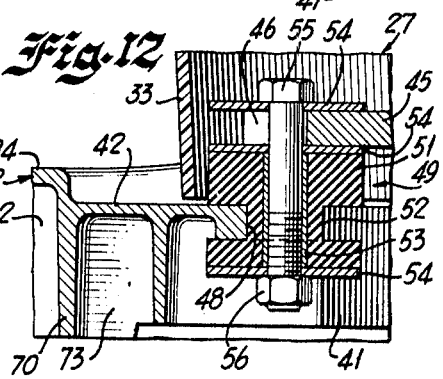

LAWN MOWER GRASS BAG

BACKGROUND OF THE INVENTION

This application is a division of U.S. Pat. application Ser. No. 562,666, filed July 5, 1966, now Pat. No. 3,468,108, issued Sept. 23, 1969, and is assigned to the same assignee as the instant invention.

As the rotary lawn mower gains in popularity, there has been an increasing demand for an efficient grass bag which may be used therewith. While the prior art is replete with many different grass catchers designed for use with rotary lawn mowers, these grass catchers are somewhat impractical and difficult to use. It would be highly desirable to have a grass catcher for a rotary lawn mower which may be easily disengaged from the lawn mower housing so that the user may quickly remove the bag when an object lies in the path of the bag. Moreover, it would be advantageous to have the removal of the bag from the lawn mower to be in such a manner that the user does not need to lift the total weight of the bag assembly and its contents. Under certain circumstances, objects may be thrown from the discharge opening of a rotary lawn mower, and for safety reasons, it is desirable that the user not stand in front of the discharge opening when removing or attaching the grass catcher. Prior art grass bags for rotary lawn mowers required that the user lift the complete weight of the bag assembly and contents in order to disengage the bag from the lawn mower; and, consequently, since the user has to lift this weight, he is normally in front of the discharge opening. Therefore, it would be a considerable improvement to have a grass bag which could be removed from a rotary lawn mower by merely tilting or pivoting the bag while the user is behind or in the normal operating position with respect to the lawn mower.

Accordingly, it is an object of the present invention to provide a grass catcher for a rotary mower which may be easily removed therefrom and which is inexpensive to manufacture.

Further objects and advantages of the present invention will become apparent as the following description proceeds and the features of novelty which characterize the invention will be pointed out with particularity in the claims annexed to and forming a part of this specification.

SUMMARY OF THE INVENTION

Briefly, the present invention relates to a grass bag assembly for a rotary lawn mower wherein the rotary lawn mower housing has a laterally facing discharge opening with a bracket positioned near the top of the opening and a supporting surface near the bottom thereof. The grass bag assembly includes an elongated bag for collecting grass defining an inlet opening at one end thereof and a frame for supporting said bag and adapted for engagement with the lawn mower housing. The frame has an upper member adapted for making a pivotal connection with the bracket and a lower member adapted for engagement with the housing surface when the upper member is in engagement with the bracket. The frame upper member may be disengaged from the bracket when the frame is pivoted through a given angle so that the lower member is no longer in engagement with the housing supporting surface.

BRIEF DESCRIPTION OF THE DRAWINGS

For a better understanding of the present invention, reference may be had to the accompanying drawings in which:

FIG. 2 is a side elevational view of the rotary lawn mower with the handle and grass bag partially broken away for convenience of illustration;

FIG. 3 is a front elevational view with the handle partially illustrated;

FIG. 6 is an enlarged sectional view taken substantially along line 6-6 of FIG. 1;

FIG. 8 is a sectional view taken substantially along line q-8 of FIG. 1 and illustrates the development or 8-of the housing channel when the curved channel is shown in a flat state;

FIG. 9 is a fragmentary sectional view taken substantially along line 9-9 of FIG. 6;

FIG. 10 is an enlarged fragmentary sectional view taken along line 10-10 of FIG. 1;

FIGS. 11 and 12 are enlarged fragmentary sectional views taken substantially along lines 11-11 and 12-12, respectively, of FIG. 7; and FIG. 13 is a fragmentary view of the lawn mower housing similar to FIG. 2 but with the grass bag and handle removed.

DESCRIPTION OF THE PREFERRED EMBODIMENT

Figure 1:
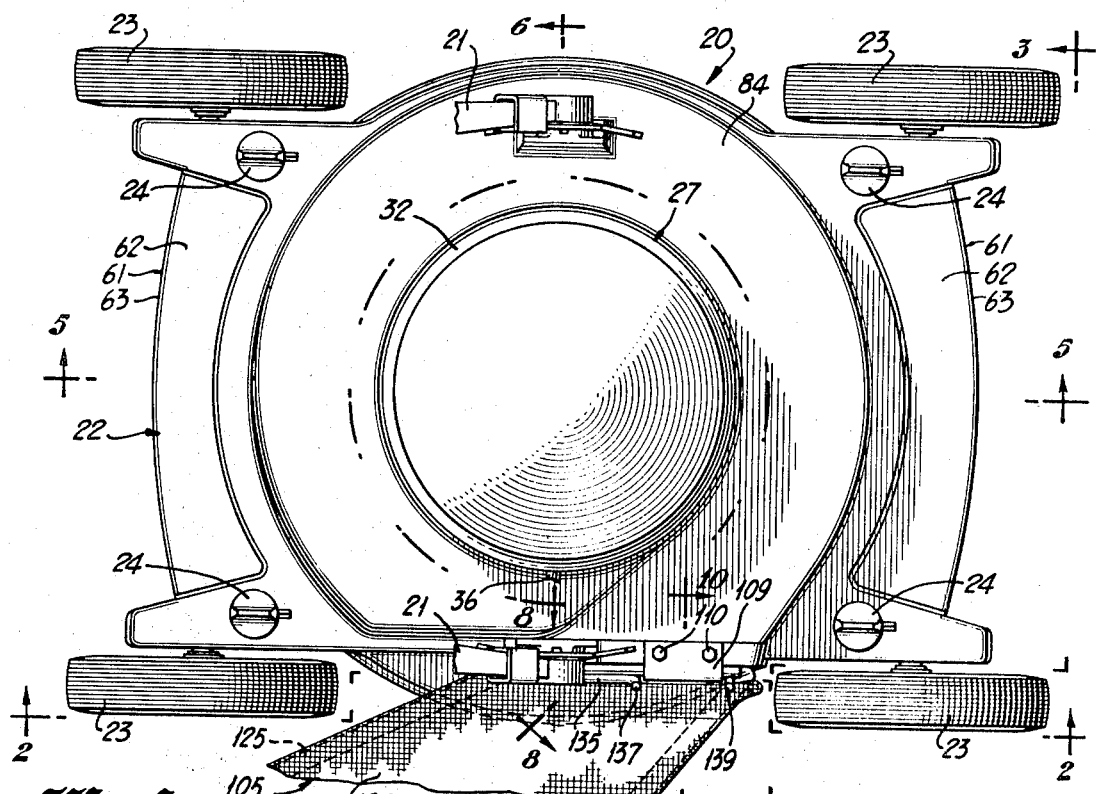
FIG. 1 is a top plan view of a rotary lawn mower embodying my invention with the grass bag and handle partially shown.

Referring to the drawings in which like numerals designate like parts throughout the several views, the rotary lawn mower is designated generally by the reference numeral 20. The lawn mower 20 includes a partially illustrated bifurcated flipover handle 21 pivotally attached to a housing 22 having supporting wheels 23 at each corner thereof. The elevation of the wheels 23 with respect to the housing 22 is controlled by four mechanisms having a rotatable control knob 24 which mechanisms are described in detail in the U.S. Pat. No. 3,390,894 which is assigned to the same assignee as in the present application. Preferably, the housing 22 is manufactured using a die casting technique and is integrally formed of either aluminum or magnesium. Either a gasoline engine or an electric motor may be used in connection with the present lawn mower 20. The drawings illustrate the housing 22 carrying an electric motor housing 27 containing an electric motor or power unit 28 having a downwardly extending drive shaft 29 supporting a rotatable cutter 30. Preferably, the housing 27 is molded from a suitable plastic material and is fabricated with an upper section 32 and a lower section 33 held together by a plurality of screws 34. The rotary cutter 30 is locked to the drive shaft 29 by means of nut 31. The pivotal handle 21 receives and carries an electric power cord 36 which passes through strain relief grommet 37 held by the lower housing section 33 and passes therein for an electric connection to the electric motor power leads. The housing 22 forms a centrally disposed vertical collar 40 defining opening 41 through which a portion of the electric motor power unit 28 extends. Surrounding the housing collar 40 is an annular shoulder 42. The electric motor housing 27 is locked to the shoulder 42 by a plurality of screws 43 which extend upwardly from underneath the housing. As may be seen in FIG. 4, apertures 44 are provided in shoulder 42 for locking purposes when a gasoline engine is mounted on the housing 22. The electric motor 28 is provided with a flange 45 having a plurality of notches 46 disposed immediately above a plurality of notches 48 formed in the shoulder 42. Mounting the motor flange 45 to the shoulder 42 and also dampening the vibrations therebetween are a plurality of mounting assemblies 49 including rubber member 51 provided with a reduced diameter portion 52 for interlocking with collar notch 48, steel tube 53, washers 54, bolt 55 and nut 56 as is best shown in FIG. 12.

Figure 7:
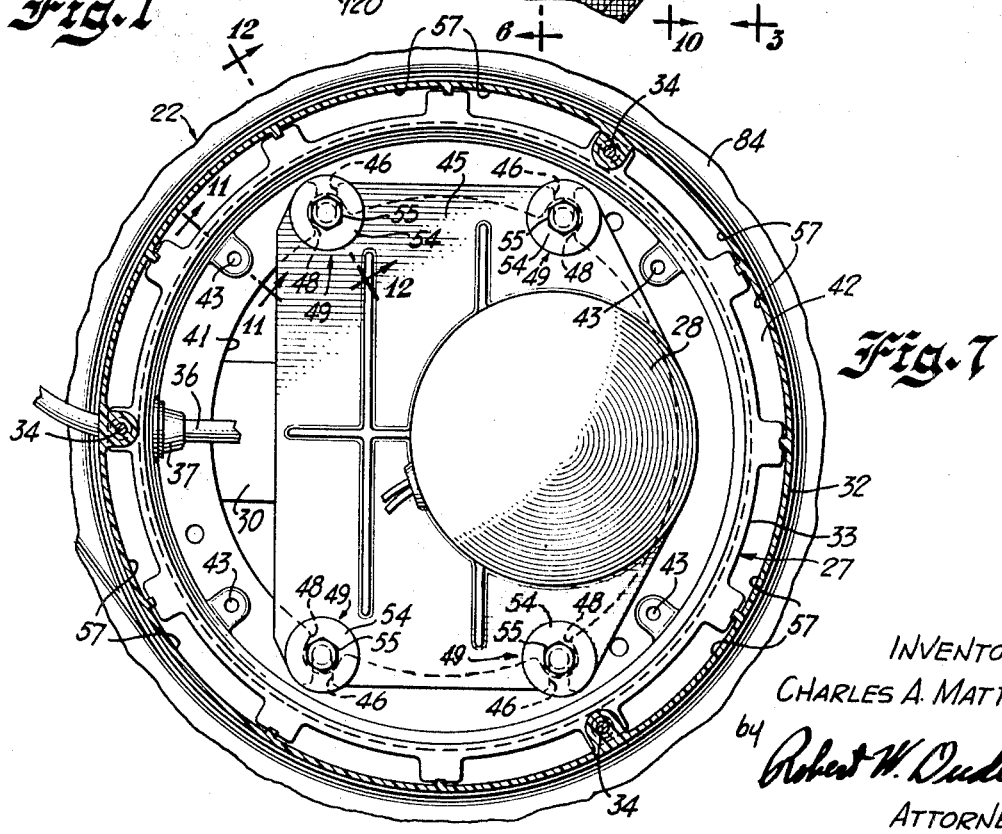
FIG. 7 is a fragmentary sectional view taken substantially along line 7-7 of FIG. 6.

In order to provide cooling air for electric motor power unit 28, there are a plurality of air inlet openings 57 between upper housing section 32 and lower housing section 33 as shown in FIG. 7. Moreover, the electric motor power unit 28 has air inlet openings at the top thereof (not shown) and air discharge openings 58 located at the lower end of the power unit. Within the power unit 28, there is an armature carrying a fan which forces air from the upper inlet openings of the power unit through the motor and out the outlet openings 58.

Figure 5:
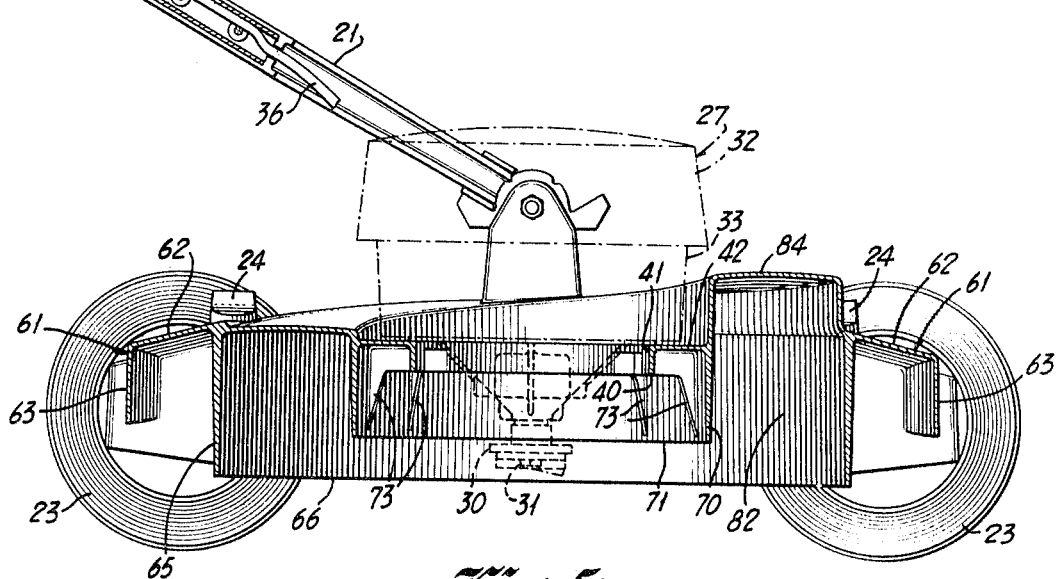
FIG. 5 is a sectional view taken substantially along line 5-5 of FIG. 1 with the electric motor housing and cutter blade shown in broken lines.

Extending transversely across the housing 22 at both the front and rear thereof are integral guards or bumpers 61 having an L-shaped configuration as may be easily seen in FIG. 5. The guards 61 have a substantially horizontally disposed leg 62 which extends outwardly and a substantially vertical leg 63 whose purpose is to prevent the accidental insertion of the user's foot in contact with the cutter 30. In addition the housing 22 includes a downwardly extending substantially cylindrical outer wall 65 which forms and defines a cutting chamber within which cutter 30 rotates. The outer wall 65 has a bottom edge 66 lying in a horizontal plane. It should be appreciated that the cylindrical outer wall 65 is concentric with the drive shaft 29 and that the cutter 30 extends closely to said wall. Positioned within the outer wall 65 is a downwardly extending inner wall 70 which is concentric with the outer wall and which inner wall has a bottom edge 71 lying in a horizontal plane spaced above from the outer wall bottom edge 66. A plurality of strengthening ribs 73 extend vertically and are integral with collar 40, shoulder 42 and inner wall 70. The cutter 30 is formed with two opposed leading cutting edges 77, fan vanes 78 positioned immediately behind the cutting edges and angled upwardly therefrom and a raised central portion 79. Upon the rotation of cutter 30, the leading cutting edges 77 sever vegetation brought in contact with it, fan vanes 78 force a considerable volume of air upwardly and raised central portion 79 is sufficiently elevated above the height of the cut vegetation that it does not rub thereagainst causing a power loss. It will be appreciated that the cutter 30 passes underneath the inner wall bottom edge 71 and that the cutting edges 77 are disposed above the outer wall bottom edge 66. The outer wall 65 and the inner wall 70 form a somewhat circular channel 82 therebetween and the housing 22 forms a roof 84 enclosing the top of the channel 82. Preferably, the channel 82 has a relatively constant width and in the present embodiment the width is approximately 4 inches. To adequately handle the airflow within the channel, the width of the channel should not be less than 2 inches. The channel 82 terminates at a discharge opening 86 in the outer wall 65 defined by inverted U-shaped flange 90 and a substantially horizontal surface 91. The U-shaped flange 90 lies in a vertical plane extending in the direction of travel of the lawn mower and includes an upper horizontal margin 92 and two vertical margins 93 and 94 disposed on each side of the discharge opening 86. A baffle 97 extends across the channel 82 tangentially from the inner wall 70 to the side margin 93. The baffle 97 has a bottom edge 98 which is coplanar with the inner well bottom edge 71. The purpose of baffle 97 is to prevent the air pumped upwardly from the cutter fan vanes 78 from making more than one revolution within channel 82. Consequently, the baffle bottom edge 98 extends relatively closely to the rotating cutter fan vanes 78. Therefore, the rotation of cutter 30 causes the fan vanes 78 to force the air upwardly which increases the air pressure above the fan vanes within the channel 82. Inasmuch as the channel 82 is open at one end due to discharge opening 86, the air is forced around within channel 82 and egresses from the discharge opening 86. A horizontally disposed housing wall 100 having the upper horizontal surface 91 is positioned adjacent the discharge opening 86 at approximately the same elevation as the inner wall bottom edge 71. Inasmuch as the housing 22 if preferably fabricated by a diecasting method, it is not practical for the wall 100 to be cast so that it extends inwardly within the housing beyond a plane defined by the U-shaped flange 90. Therefore, a sheet metal extension 101 secured to the housing by means of a plurality of screws 99 is juxtapositioned with surface 91 to effectively extend wall 100 inwardly within the housing a short distance in order to prevent any object hit by the cutter 30 from being hurtled out of the discharge opening 86 before striking the housing 22. It is recognized from a safety standpoint that it is desirable to have the angle of exposure between the outer cutting tip of the rotary cutter and the discharge opening as small as possible and to be definitely less than 30°. THe exposure angle is considered to be the angle defined by a horizontal plane containing the outer cutting tip of the cutting edge and a line extending tangentially from the circularly moving tip to the upper edge of the discharge opening. In the lawn mower herein disclosed, the exposure angle is approximately zero and consequently, the likelihood of an object such as a rock being hurtled out of the discharge opening before contacting some portion of the housing is remote. On the other hand, it has been determined by the applicant that it is highly desirable to have the roof 84 of the channel 82 completely exposed above the area defined by the rotation of the fan vanes 78. When the channel roof remains substantially above the cutter fan vanes, the vanes are very effective in pumping air in sufficient volume to clean the roof and thereby lessen the likelihood of grass clippings attaching thereon. Thus, the horizontal housing wall 100 extends inwardly only a distance sufficient to maintain the exposure angle at substantially zero and is sufficiently small so that nearly all of the channel roof 84 lies above the area defined by the rotation of the cutter fan vanes 78. Moreover, it should be appreciated that the discharge opening 86 is substantially recessed inwardly from the periphery of the outer wall 65. Consequently, each side of housing outer wall 65 can come into contact with an object or obstacle on a lawn and the cutter cutting edge 77 can be cut sufficiently close to such an object so that a separate trimming operation after mowing is not necessary. Furthermore, for a reason to be discussed hereinafter, a suction or a pressure below atmospheric is maintained beneath the outer wall bottom edge 66 throughout its entirety so that when the outer wall is brought adjacent to an object, the suction tends to draw the grass blades adjacent to the object within the housing and to be severed by the cutting edges 77.

Figure 4:
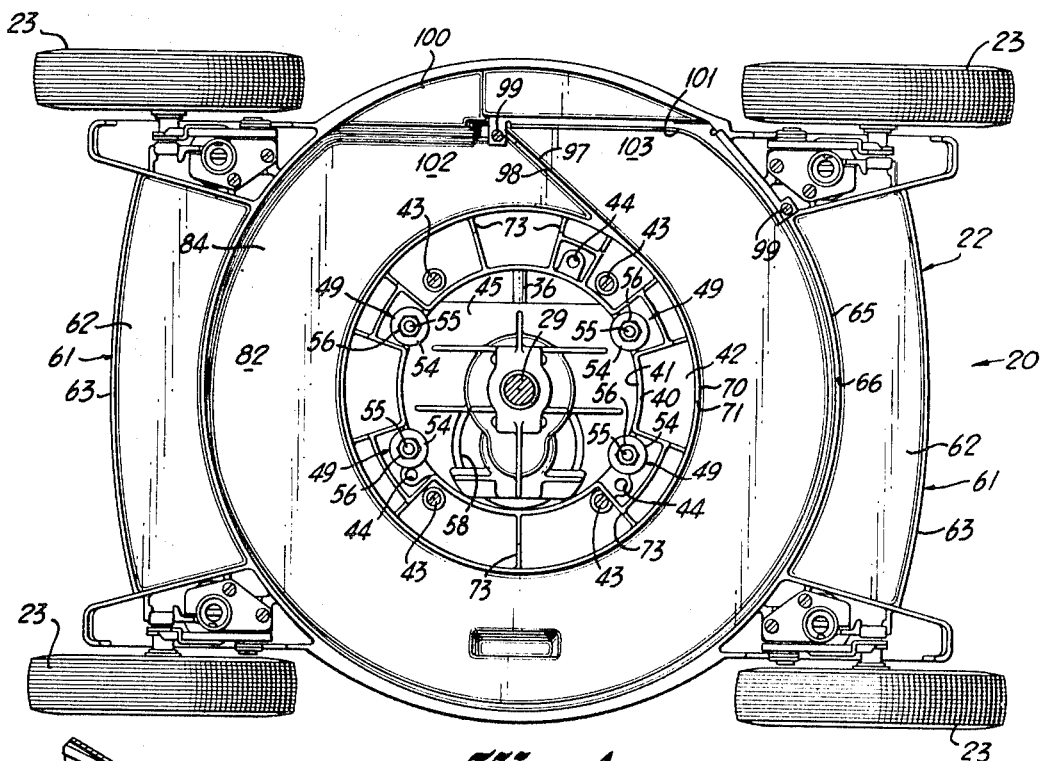
FIG. 4 is a bottom plan view of the rotary lawn mower without the grass bag.

In accordance with the present invention, the channel roof 84 is inclined from an area of low elevation 102 rearwardly from the baffle 97 as viewed in FIG. 4 to an area of high elevation 103 adjacent to the discharge opening 86. As may be seen in FIG. 8 where the channel roof 84 is shown in the layout giving the height of the roof in inches and locations in degrees that in the preferred embodiment, the roof rises by more than 2¼ inches from the low elevation 102 to the area of high elevation 103. The area of low elevation 102 is flattened in order to prevent the roof from extending substantially below the annular shoulder 42 and thereby collect dirt, water and other undesirable material. The high elevational area 103 is likewise flattened and lies in a horizontal plane immediately adjacent the discharge opening 86 to reduce the angle at which severed vegetation is propelled from the discharge opening. However, the portion of roof 84 lying between areas 102 and 103 is uniformly inclined. In order to reduce the power consumption in pumping air with fan vanes 78, the roof 84 lies an appreciable distance above the outer wall lower edge 66 forming a relatively deep channel 82. With this construction, the air pressure immediately above the plane in which the fan vanes 86 rotates is reduced and thereby establishes suction below the entire length of outer wall lower edge 66. Moreover, the severed vegetation which is carried upwardly due to the pumping action of fan vanes 78 has an opportunity to change direction towards the discharge 86 and thus, the impact between the severed vegetation and the channel roof 84 is reduced causing reduced clipping buildup or encrustations on the roof. The height or elevation of the roof increases towards the discharge opening in order to provide an increasing volume for the air being pumped upwardly by the cutter 30. Any increase in the efficiency in handling the air within the housing leaves more power available to either sever grass or as a reserve against the decrease in the power unit efficiency due to wear and tear. Tests have revealed that considerably less power is required with the deep channel design disclosed herein than prior art lawn mower housings employing a shallow channel design. In the preferred working embodiment, the distance between the roof 84 and the outer wall bottom edge 66 is 4.125 inches for the first 76.6°, gradually increases in height to 6.469 inches at 315° and remains constant to the discharge opening 86. If the distance between the roof and the bottom of the outer wall is less than 3 inches, the efficiency of the housing is considerably reduced causing a need for more power to pump the air through the housing.

For collecting the severed grass clippings and vegetation propelled through the discharge opening 86, there is provided a collection bag assembly 105 which is selectively engageable with the lawn mower housing 22. As may be easily seen in FIGS. 10 and 13, the housing 22 has a horizontally extending surface 107 disposed immediately above the discharge opening 86. For the purpose of securing the collection bag assembly 105, the housing 22 has an L-shaped bracket 109 locked to the surface 107 by a plurality of bolts 110 so that bracket leg 111 is attached thereto and bracket leg 112 extends downwardly and is spaced from the U-shaped flange upper margin 92. Inasmuch as the housing 22 may be made in different sizes whereby the height of the discharge opening 82 varies, a spacer 114 having a U-shaped portion 115 is sandwiched between the bracket 109 and the surface 107 whereby the U-shaped portion 115 reduces the depth of bracket recess 116 defined by margin 92 and leg 112. The spacer 114 is not needed for decks of a smaller size where the distance from a comparable surface 91 to leg 111 is approximately the same distance between the bottom of spaced U-shaped port on 115 to surface 91.

In accordance with the present invention, the collection bag assembly 105 comprises an elongated porous bag 120 having an opening 121 at one end to receive grass clippings and a zipper at the opposite end (not shown) to assist in the removal of grass clippings, from the bag 120. Preferably, the bag 120 is made from porous fabric which allows air to easily pass therethrough. Consequently, the large volume of air emanating from the discharge opening 86 and entering into the bag 120 easily passes through the bag fabric while the clippings remain therein. Supporting the bag 120 is a rigid frame 123 including an upper U-shaped rod 124 which is slidably received in the frame lower portion 125. It is preferable that the frame be made in two pieces to facilitate the shipment of the frame 123 and the bag 120. The frame lower portion 125 defines a rectangular opening 126 by two spaced vertically extending side members 128 and 129 and by spaced horizontally extending upper and lower members 130 and 131. A plurality of projections 133 are attached to the frame lower portion 125 around the rectangular opening 126 for securing the bag opening 121 adjacent to the rectangular opening 126. For the purpose of holding the bag opening 121 in its proper position, it is preferable that an elastic band be disposed within the bag around the opening to cause the bag to fasten itself to the projections 133. The members 128 through 131 may be made from circular steel rods and may be rigidly locked together by welding. Attached to the upper member 130 is rod 135 having upturned ends 136 and 137. The rod 135 is juxtapositioned with member 130 and extends therewith for over half the length of the member 130. In addition, an upwardly directed projection 139 is secured by any suitable manner such as welding to the member 130 near the end thereof adjacent to member 129. As may be seen in FIGS. 2 and 10, member 130 is insertable into bracket recess 116 between the rod upturned end 137 and the projection 139. When the member 130 is received within the recess 116, the bag may be pivoted with respect to the housing 22. The member 130 is inserted into the recess 116 by having the member 103 positioned below the recess and then raising the member. As the frame 123 is pivoted downwardly, the side members 128 and 129 abut the side margins 93 and 94 respectively, and member 131 rests on the horizontal housing surface 91 as illustrated in FIG. 10 in solid lines. In this position, he grass bag opening 121 is in register with the discharge opening 86 and consequently, can receive any material emanating therefrom. It should be appreciated that the weight of the frame 123, bag 120 and any material contained therein tends to pivot the collection bag assembly 105 downwardly or into a locked position. For the purpose of affording better contact between the lower member 131 and housing surface 91, the member 131 is shaped with a horizontally extending V-shaped portion 141 as may be seen in FIG. 9. To facilitate the handling of collection bag assembly 105, the bag 120 is fabricated with a strap 143 which may be conveniently grasped by the user.

While operating the lawn mower if the path of bag assembly 105 would strike an obstacle, the user merely pivots the assembly by raising the strap 143 causing the lower member 131 to pivot outwardly through a given angle until it clears the housing surface 91 as illustrated in broken lines in FIG. 10 whereupon the assembly automatically drops downwardly disengaging member 130 from bracket recess 116 thereby severing the connection between the grass bag assembly 105 and the lawn mower housing 22. Thus, the user, by merely pivoting the bag, can quickly disengage the bag assembly from the mower. It should be appreciated that it is not necessary for the user to lift the full weight of the bag assembly and contents therein to effect disengagement. Since the pivotal movement required to disengage the bag assembly from the mower may easily be accomplished by one hand of the user, it is not necessary for the user to move from his operating position behind the mower and consequently, the user does not need to stand in front of the discharge opening and in the path of objects emanating therefrom. In order to insert the bag assembly back onto the lawn mower, the member 130 is positioned within bracket recess 116 and the frame 123 is pivoted downwardly until the frame abuts against the side margins 93 and 94 and the horizontal surface 91. Therefore, the bag assembly is easily removed with a single movement which does not require the user to bear the full weight of the bag assembly can contents and it is not necessary for the user to position himself in front of the discharge opening in order to effect an engagement or disengagement between the bag assembly and the housing.

While there has been illustrated and described a particular embodiment of the present invention, it will be understood that changes and modifications may occur to those skilled in the art and it is, therefore, contemplated by the appended claims to cover all such changes and modifications as fall within the true spirit of the present invention.

What I claim as new and desired to be obtained by Letters Patent of the United States is:

1. A grass bag assembly for a rotary lawn mower having a housing, a substantially rectangular lateral discharge opening in said housing, a supporting wall disposed near the bottom thereof and a bracket secured to the portion of the housing defining the top of the opening, said bracket and the side of said portion of the housing defining a channel above said opening comprising a flexible bag having an inlet opening at one end thereof, a frame removably supporting said bag, said frame having a substantially rectangular portion registerable with said discharge opening, a plurality of projections on said substantially rectangular portion for maintaining said bag inlet opening in register with said substantially rectangular portion and said discharge opening, and a bag-supporting portion extending outwardly from said substantially rectangular portion and said discharge opening, said substantially rectangular portion being formed by two side members, and upper and lower members, said upper member pivotally engageable in said channel so that said frame is pivotable with respect to the mower for bringing said substantially rectangular portion in register with the lawn mower discharge opening, said lower member supporting said frame and bag by engaging with and resting upon said supporting wall whereby pivotal movement of said frame disengages it from the mower.

2. The grass bag assembly of claim 1, wherein said lower member has a nonlinear configuration in the plane of said supporting wall for increasing the engagement area between said lower member and said supporting wall.

3. A grass bag assembly for a rotary lawn mower having a lateral discharge opening with supporting wall disposed near the bottom thereof and a bracket near the top of the opening comprising a bag having an opening at one end thereof, a frame supporting said bag, said frame including first frame means for holding said bag opening in register with the lawn mower discharge opening, second frame means pivotally engageable with said lawn mower bracket so that said fame is pivotable with respect to the mower for bringing said bag opening in register with the lawn mower discharge opening, third frame means supporting said frame and bag by engaging with and resting on the lawn mower wall whereby pivotal movement of said grass bag assembly disengages it from the mower, said third frame means including an element having a nonlinear configuration, said element being forced into engagement with said wall when said second frame means is pivotally attached to the lawn mower bracket due to the weight of said bag and frame tending to rotate the bag assembly downwardly, and including a horizontally disposed first member registerable with the lawn mower immediately above the discharge opening, a second member attached to said first member and extending therewith for a distance less than the length of said first member, said second member having upturned ends for assisting in holding said bag opening in position, that portion of said first member which is not coextensive with said second member pivotally engageable with the lawn mower bracket.

4. The grass bag assembly of claim 1 wherein said two side members have segments extending above said upper member which are bent outwardly to form said bag-supporting portion.

5. The grass bag assembly of claim 4 wherein said segments are tubular and a U-shaped rod for further supporting said bag is slidably received in said segments.

6. The grass bag assembly of claim 2 wherein said supporting wall is horizontally disposed and said nonlinear configuration is a bend in the horizontal plane of said lower member.

7. A rotary lawn mower provided with a removable grass collecting bag assembly comprising a rotary lawn mower having a housing, a lateral discharge opening lying in a vertical plane of said housing, a horizontally disposed supporting wall near the bottom thereof, a bracket secured to the portion of the housing defining the top of said opening, said bracket and the side of said portion of the housing defining a channel above said opening, an elongated flexible grass collection bag having an inlet opening at one end thereof, a rigid frame removably supporting said bag, said frame having a portion registrable with said opening, a plurality of projections on said registrable portion for maintaining the bag inlet opening in register with said registrable portion and said discharge opening, and an outwardly extending bag supporting portion for supporting said elongated bag, said registrable portion being formed by a pair of side members and upper and lower horizontally disposed members, said upper member pivotally engageable in said channel to pivot said frame with respect to the mower for bringing said registrable portion in register with the lawn mower discharge opening, said lower member supporting said frame and bag by engaging with and resting upon said horizontally disposed supporting wall whereby upward pivotal movement of said frame disengages it from the mower.

8. In the rotary lawn mower of claim 7 wherein said bracket in L-shaped and said channel is defined by the side of said portion of the housing, part of one leg of said L-shaped bracket and the other leg of said L-shaped bracket.

9. In the rotary lawn mower of claim 7 wherein said housing has marginal surfaces at each side of said discharge opening, each of said pair of side members abutting one of said marginal surfaces to assist supporting said frame and bag in register with said discharge opening.

10. In the rotary lawn mower of claim 7 wherein said pair of side members each have tubular segments extending above said upper horizontally disposed member, said tubular segments being bent outwardly to form said bag supporting portion, and a U-shaped rod for further supporting said elongated flexible grass collection bag is slidably received in said tubular segments.

11. In the rotary lawn mower of claim 7, wherein said lower horizontally disposed member is formed with a bend in the horizontal plane to increase the area of engagement between said lower member and said horizontally disposed supporting wall.